MICROWAVE AMPLIFIER

Filed May 29, 1958 2 Sheets-Sheet 1

INVENTORS R. J. COLLIER
J. FEINSTEIN
BY James W. Falk
ATTORNEY

INVENTORS R. J. COLLIER
J. FEINSTEIN
BY James S. Falk
ATTORNEY

United States Patent Office 2,988,669

Patented June 13, 1961

2,988,669

MICROWAVE AMPLIFIER

Robert J. Collier, New Providence, and Joseph Feinstein, Livingston, N.J., assignors to Bell Telephone Laboratories, Incorporated, New York, N.Y., a corporation of New York Filed May 29, 1958, Ser. No. 738,893
13 Claims. (Cl. 315—39.3)

This invention relates to microwave apparatus and more particularly to amplifiers wherein interaction occurs between the electromagnetic waves associated with an electron stream and with a slow wave structure.

The slow wave properties of an array of parallel plate, quarter-wave resonators are well known in the field of traveling wave interaction devices. Such slow wave structures when used, for example, in high power crossed-field amplifiers have certain advantages in power handling capability and thermal dissipation ability. However, because of the close balance which exists between the inductive and capacitive coupling of adjacent elements in this type of structure, the bandwidth has been extremely narrow. Various modifications have been suggested to overcome this bandwidth limitation. For example, in magnetrons, mode separation, the analog of bandwith in a resonated system, has been obtained by strapping or rising sun configurations, and such arrangements may be utilized to widen the operating bandwidths of corresponding traveling wave structures. Defects of impedance and mode purity, however, mitigate against the use of these arrangements in amplifiers of the type set forth below.

It is a general object of this invention to provide an improved microwave amplifier device.

It is another object of this invention to increase the usable bandwidth of amplifier devices utilizing electron beam and traveling wave interactions and an array of resonators as a part of the slow wave structure.

Another object of this invention is to facilitate the obtaining of operation of such devices with operation characteristics, such as phase shift and characteristic impedance, which match the characteristics of the associated input and output lines.

A further object of this invention is a slow wave amplifier device having the above and other desirable objects which may be utilized for either forward or backward wave operation.

A still further object of this invention is to attain wide bandwidths while at the same time still maintaining to a large degree the high electronic impedance characteristic of vane resonators, the electronic impedance being a measure of the ability of the waves on the circuit to interact with the electrons in the electron stream.

These and other objects of this invention are attained in one specific illustrative embodiment wherein complete isolation is maintained between the electron stream and the traveling electromagnetic wave. In this specific illustrative embodiment a flat electron beam is projected along a linear array of cavity resonators. Straight field magnetic focusing is provided for the electron stream. In a crossed-field amplifier the resonator array would be circularly arrayed. Attached to the same plate forming the short circuit end of the resonators but to the other side thereof are wave guiding members which define the width and height of bends in a serpentine wave guide. The resonators are coupled to the wave guide by coupling slots in this plate and thus at their back ends or short circuit portions. The plate width, and thus the coupling slot length, is advantageously very small so that the slots introduce no transformer action. Further, in order to attain the desired high electronic impedance, large energy storage in the coupling slots is undesirable.

Thus, the amplifier structure should have a maximum bandwith for a minimum capacitive stored energy.

Amplifiers in accordance with our invention have many properties and characteristics common to the general class of traveling wave amplifiers. Thus, they act to amplify microwave power fed through an input wave guide and transformer into a slow wave structure. In accordance with our invention, however, this slow wave structure is a composite structure including a serpentine wave guide coupled by coupling slots to resonant circuits. Complete separation and isolation of the microwave circuit from the electron beam is thus obtained in amplifiers in accordance with our invention.

The purpose of the slow wave structure is to reduce the phase velocity of the electromagnetic wave from a value near the velocity of light to a velocity to which electrons can be accelerated using moderate voltages. By maintaining synchronism between wave velocity and electron beam, velocity interaction can be obtained such that the beam is bunched by the wave. The bunched beam then gives up energy to the wave, thereby amplifying it.

The serpentine wave guide may be rectangular, ridge type, or other type of wave guide. Both normal dispersion or forward wave operation and anomalous dispersion or backward wave operation are attainable. Generally forward wave operation would utilize a propagating dominant mode rectangular or ridge-type wave guide with coupling to each resonator, whereas in the absence of our invention, backward wave operation would utilize a wave guide which is coupled to only every other resonator. However, by utilizing a serpentine wave guide in the composite slow wave structure, in accordance with an aspect of our invention, the stability advantages of coupling to every resonator may be retained for backward wave operation, the length of the serpentine wave guide between adjacent coupling slots determining whether the device utilizes backward or forward wave operation. Further, a propagating wave guide, rather than a wave guide below cut-off in its dominant mode, is employed. In the specific illustrative embodiment of our invention described herein a ridge-type wave guide is employed with coupling to every resonator and backward operation is attainable if the phase shift per period in the wave guide, that is, between adjacent coupling slots, is greater than 180 degrees.

The serpentine wave guide provides a periodically loaded ridge which acts as a bandpass filter and has cut-offs at frequencies corresponding to 0 radians phase shift per period of the structure and to integral numbers of $\pi$ radians phase shift per period. In this specific embodiment of our invention every wave resonator is coupled at its low impedance point to a single ridge guide of the serpentine path by means of a coupling slot. Thus, the ridge guide is loaded periodically at the position of the coupling slots.

In accordance with an aspect of our invention the serpentine wave guide allows the path length in the guide per period, i.e., the path length in the guide between adjacent coupling slots, and therefore the phase shift per period of the wave in the guide to be accurately determined from a minimum (when the guide is perfectly straight) to any desired greater value dependent on the length and height of the wave guide members attached to the back of the coupling plate intermediate the coupling slots. Further explanation of the properties of the slow wave structure proceeds most readily from an analysis of the phase-frequency characteristics (dispersion curve) of the periodically loaded guide viewed as a filter network, as one of the advantages of devices in accordance with our invention is the flexibility of the structure in attaining a wide range of dispersion characteristics.

The phase shift per period in the periodically loaded guide may be expressed in the form $$\cos\beta=\cos\beta_g+\frac{Z_v}{2Z_g}\,\frac{\cot\left[\frac{\pi}{2}\frac{\omega}{\omega_0(\beta)}\right]}{1-\frac{Z_v\cot\left[\frac{\pi}{2}\frac{\omega}{\omega_0(\beta)}\right]}{Z_s\tan\left[\frac{\pi}{2}\frac{\omega}{\omega_s}\right]}}\cdot\sin\beta_g$$

where:

$\omega$=angular frequency of the wave on the circuit;

$\beta_g$=radians phase change per period in the wave guide alone;

$\beta$=radians phase change per period in the composite system of vanes and ridge guide;

$Z_g$=characteristic impedance of the ridge guide;

$Z_v$=characteristic impedance of the vane resonators;

$Z_s$=characteristic impedance of the coupling slot;

$\omega_0(\beta)$=the frequency at phase shift where the vanes present zero impedance to the guide at the coupling slots;

$\omega_s$=coupling slot resonant frequency.

Related to the above-cited parameters are the following:

$v_p=\omega/\beta$=wave phase velocity in units of radians/periodic section; and $v_e$=electron velocity.

The match-point frequency occurs when $$\omega=\omega_0(\beta)=\omega_0(\beta_g)$$

for then the second term on the right of the equation goes to zero and the composite phase shift per section equals the phase shift per period in the ridge guide alone. At the match-point frequency, accordingly, the phase shift and characteristic impedance of the composite slow wave structure, including the vanes and the ridge guide, are the same as in the ridge guide alone. Accordingly, the input and output sections of wave guide need only be matched to the ridge wave guide to obtain proper impedance matching and prevent undesired reflections, thereby considerably facilitating the input and output problems in such traveling wave structures. Thus, in accordance with an aspect of our invention, a structure as herein described can readily be operated in a frequency band around the so-called match-point frequency. Further, the match-point frequency can readily be varied over a wider range of frequencies in the pass band of the structure by changing the serpentine ridge guide path length between coupling slots.

The coupling slot whose impedance is $Z_s$ is effectively shorted out by the vanes at the match point and does not store energy. Further, as noted above, since the composite slow wave structure at the match-point frequency band has the characteristics of the ridge guide alone, impedance matching may be made to the ridge guide alone. Additionally, at the match point the coupling of the vanes to the guide is purely inductive, which is desirable from the standpoint of maintaining high electronic impedance, i.e., enabling the waves on the circuit to interact efficiently with the electrons.

The serpentine path of the ridge guide allows one to vary $\beta_g$, the phase shift between slots in the ridge guide, and therefore to vary the frequency at which the match point $\omega=\omega_0(\beta_g)$ occurs. One can therefore choose a frequency $\omega$ with corresponding phase shift $\beta=\beta_g$ such that the wave phase velocity $$v_p=\frac{\omega}{\beta}$$

equals $v_e$ which may be predetermined to be some electron beam velocity readily obtainable with moderate voltages.

For forward wave operation the value of $\beta_g$, the phase shift per period in the wave guide, should be less than 180 degrees, whereas backward interaction is obtainable even with every resonator coupled to the wave guide by making the phase shift per period, $\beta_g$, in the guide greater than 180 degrees.

It is a feature of this invention that a microwave amplifying device include an array of cavity resonators, across the open ends of which an electron beam is projected, and a serpentine wave guide adjacent the closed ends of the resonators and coupled thereto.

It is another feature of this invention that the effective electrical length of the wave guide between successive coupling slots be determined by wave guide members attached to the conducting member defining the closed ends of the resonators, these wave guide members thus causing the wave guide to have a serpentine configuration. Further in accordance with this feature of our invention, the operating characteristics of the device, as to whether it operates in a forward or backward wave manner, is determined by these wave guide members and by the electrical length of the wave guide between coupling slots.

It is a further feature of this invention that the length and height of the wave guide members defining the serpentine configuration of the wave guide be chosen so that the composite slow wave structure operates at substantially the match-point band of frequencies. This enables impedance matching to the composite slow wave structure of the device to be obtained by matching from the input and output connections solely to the wave guide alone without the necessity of auxiliary matching devices. Concomitantly, at the match-point frequency band, the coupling slots between the resonators and the serpentine wave guide do not store energy. Further, operation at the match point may be attained, in accordance with our invention, with moderate electron velocities, readily attainable at reasonable voltages.

It is a still further feature of our invention that the coupling slots be of very short and substantially zero electrical length, as determined by the width or thickness of the conducting member defining the closed end of the resonators, so as to introduce no impedance transformation between the resonators and the wave guide.

These and other desirable features of our invention may be readily understood from a consideration of the following detailed description, together with the accompanying drawing, in which.

Figures 1, 2:
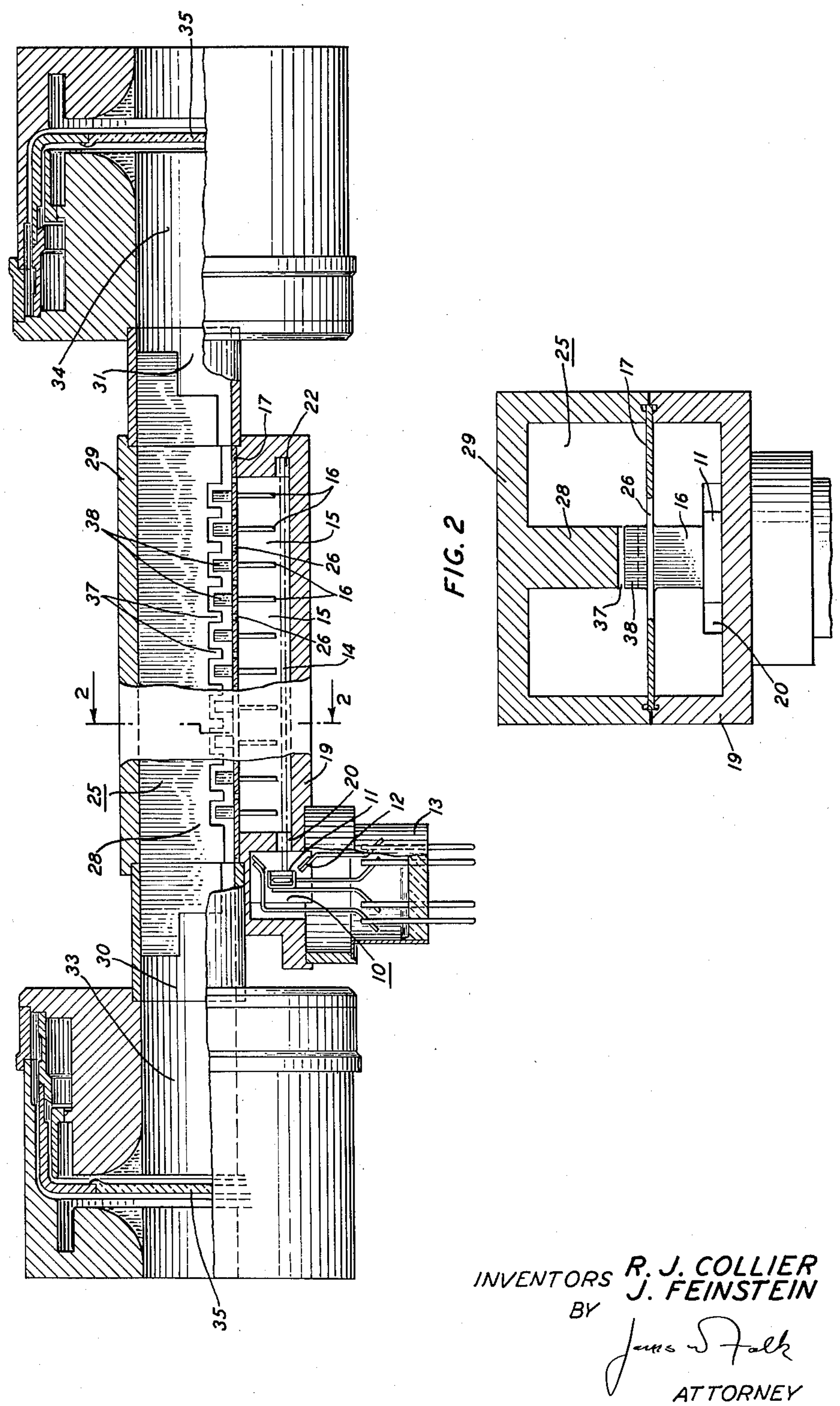
FIG. 1 is a side view, mainly in section, of one specific illustrative embodiment of our invention.
FIG. 2 is a sectional view along the line 2—2 of FIG. 1.

Referring now to the drawing, the specific illustrative embodiment of our device depicted in FIGS. 1 and 2 comprises an electron gun 10 including a cathode 11 and focusing electrode 12 mounted in a stem 13 for projecting an electron stream 14 adjacent the open ends of resonators 15 defined by vanes 16 and end closing plate 17. The resonators 15 and the path of the electron stream are within a rectangular enclosure defined by the end plate 17 and wall member 19, the electron stream being projected through an aperture 20 in the wall member 19 and the wall member thereby serving as the accelerating anode of the electron gun 10. A groove 22 in the wall member 19 directly opposite the aperture 20 serves as the collector for the electron stream. External magnets, not shown, and which may be of the various types known in the art, including permanent magnets, electromagnets, periodic focusing arrangements, et cetera, provide magnetic fields parallel to the beam direction for focusing the electron beam. In the specific embodiment depicted in the drawing operation as a collinear device is attained. Operation as a "crossed-field" amplifier is also possible in other specific illustrative embodiments of our invention by suitable electron gun and electrode modifications; in crossed-field operation the electrons travel past the slow wave circuit in a region of crossed direct current electric and magnetic fields. However, the properties and advantages of our invention including those of the composite slow wave structure do not depend on whether the tube be operated collinearly or as a crossed-field device.

The slow wave structure includes, in accordance with our invention, the resonators 15 and a wave guide 25 coupled thereto by coupling slots 26 extending through the end plate 17 at the rear or base of each resonator 15. The wave guide 25 in this specific illustrative embodiment is of the ridge type including a ridge or fin member 28 mounted by the upper wall 29 of the wave guide 25 and extending toward the end plate 17 separating the wave guide 25 from the resonators 15. As can be seen, the ridge or fin 28 has the same width as the resonator vanes 16. Longitudinal current flow is limited to the ridge 28 and by this arrangement, in accordance with an aspect of our invention, no discontinuity is introduced into the guide pattern by the coupling effected between the guide 25 and the resonators 15 by the coupling slots 26.

The guide 25 is coupled through input and output transformers 30 and 31, respectively, to input and output wave guide connectors 33 and 34 each including a wave permeable window 35 forming part of the vacuum envelope of the device, as is known in the art.

In accordance with one aspect of our invention the ridge member 28 has depending fingers 37 extending toward the end plate 17 and specifically positioned directly above the coupling slots 26. Also, there are mounted or supported by the end plate 17 wave guide members 38 extending toward the ridge member 28 intermediate the fingers 37 and positioned directly at the vanes 16 but to the other side of the end plate 17 thereof. As can be seen in FIG. 2, the fingers 37 and members 38 also have the same width as the ridge member 28 and the vanes 16.

Because of the presence of the fingers 37 and the members 38 the ridge wave guide 25 is effectively a serpentine wave guide, as can readily be seen in FIG. 1. The path length in the serpentine wave guide thus formed is determined by the size of the fingers 37 and the members 38 and may readily be predetermined, thereby determining the phase shift per period of the wave in the guide 25 to determine both the mode of operation, i.e., either forward or backward operation, and the operation of the device at the match-point frequency band, as discussed above.

Figure 3:
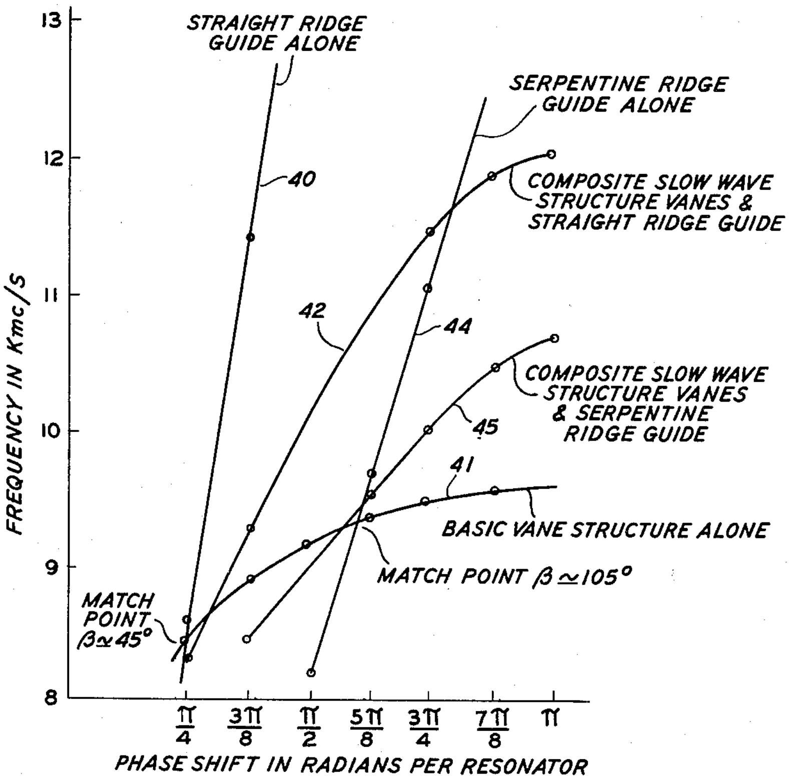
FIG. 3 is a plot of dispersion characteristics for various slow wave structures for two exemplary conditions.
Figure 4:
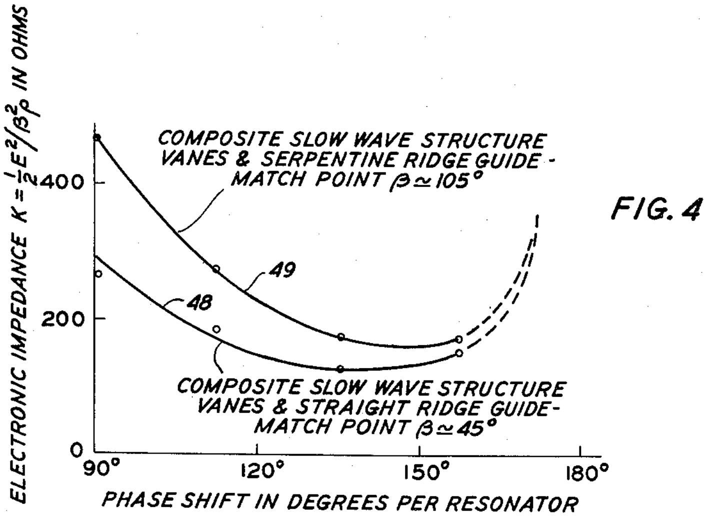
FIG. 4 is a plot of electronic impedance for two values of match frequency.

An example in which the slow wave circuit interacts with the electrons by means of a forward wave is depicted in the plots of FIGS. 3 and 4. FIG. 3 shows the effect on the dispersion curve of changing the match-point from 45 degrees to 105 degrees. The value $\beta_g=45°$ was obtained with a straight ridge guide and the synchronous velocity at the match point is prohibitively high, the electrons being required to attain velocities approximating the speed of light. Curve 40 depicts the dispersion characteristic for a straight ridge guide alone; curve 41 depicts the dispersion characteristic for the vane resonator structure alone; and curve 42 depicts the dispersion characteristic for the composite slow wave structure including the straight ridge guide.

Also depicted in FIG. 3 is the dispersion characteristic for one specific illustrative embodiment wherein the height of the wave guide members was .111" and their width .063", whereby the serpentine wave guide 25 had a period of .407". Curve 44 is the dispersion curve of the serpentine ridge guide alone and curve 45 that of the composite slow wave structure in accordance with this specific embodiment of our invention. The intersection of these curves at curve 41, which depicts the dispersion characteristic of the basic resonator vane structure alone, gives the match-point frequency at a phase shift of about 105 degrees. The electron velocity requisite for this match-point operation may readily be attained with reasonable electron gun voltages.

The match point and the frequency of operation of the tube are readily determinable by the dimensions of the serpentine wave guide and specifically by its period and the dimensions of the wave guide members 38 and complementary fingers 37. While in the example shown by curve 45 in FIG. 3 forward wave interaction was utilized, it is also readily possible to attain backward wave interaction with every vane resonator coupled to the ridge guide, as desired for stability considerations, by making the phase shift per period $\beta_g$ in the guide greater than 180 degrees.

It should be emphasized that the fact that one speaks of a match point does not imply that the device will amplify satisfactorily at only that frequency. The device is designed to operate over a desired bandwidth centered at the match-point frequency. In fact, devices in accordance with our invention are broad band amplifiers and the meritorious advantages of our invention may be attained over wide frequency bands.

The bandwidth impedance varies directly with spacing between the ridge and the adjacent guide portions forming the serpentine wave guide, i.e., between the ridge 28 or fingers 37 and the wave guide member 38. The larger the spacing, the larger the value of the characteristic impedance of the ridge guide, $Z_g$, and the larger the bandwidth for a given range of phase change per period, $\beta$, in the composite system of vanes and ridge guide. However, as the bandwidth increases, the electronic impedance decreases. FIG. 4 is a plot depicting the electronic impedance as a function of the phase shift $\beta$ for the two structures discussed above with reference to FIG. 3, i.e., curve 48 shows the electronic impedance for a structure with a straight ridge guide composite slow wave circuit and curve 49 for a structure with a serpentine ridge guide composite slow wave circuit.

It is to be understood that the above-described arrangements are illustrative of the application of the principles of the invention. Numerous other arrangements may be devised by those skilled in the art without departing from the spirit and scope of the invention.

What is claimed is:

1. An electron discharge device amplifier comprising means defining a plurality of adjacent resonant cavities each having an open end and a closed end diametrically opposite thereto, means including a cathode for causing a stream of electrons to flow past the open ends of said cavities, a wave guide adjacent the closed ends of said cavities, said wave guide being coupled to at least certain of said cavities by coupling slots extending through said closed ends, and means determining the effective electrical length of said wave guide between successive of said slots, said last-mentioned means including means determining said wave guide to have a serpentine configuration.

2. An electron discharge device in accordance with claim 1 wherein said wave guide is coupled to each of said resonators by one of said coupling slots and the electrical length of said wave guide between adjacent slots is such that the phase shift per period in the wave guide is less than 180 degrees whereby forward wave interaction occurs between said electron stream and energy in said wave guide.

3. An electron discharge device in accordance with claim 1 wherein said wave guide is coupled to each of said resonators by one of said coupling slots and the electrical length of said wave guide between adjacent slots is such that the phase shift per period in the wave guide is greater than 180 degrees whereby backward wave interaction occurs between said electron stream and energy in said wave guide.

4. An electron discharge device in accordance with claim 1 wherein said coupling slots are of effectively substantially zero electrical length.

5. An electron discharge device amplifier comprising means defining a plurality of adjacent resonant cavities each having an open end and a closed end diametrically opposite thereto, means including a cathode for causing a stream of electrons to flow past the open ends of said cavities, a wave guide adjacent the closed ends of said cavities, said wave guide being coupled to said cavities by slots in said closed ends, and means determining the effective electrical length of said wave guide between successive of said slots, said last-mentioned means including wave guide members attached to said closed ends of said cavities between said slots and causing said wave guide to have a serpentine configuration.

6. An electron discharge device in accordance with claim 5 wherein said closed ends are defined by a metallic wall member common to said cavities and said wave guide.

7. An electron discharge device in accordance with claim 6 wherein said wave guide is a ridge-type guide.

8. An electron discharge device in accordance with claim 7 wherein fingers depending from the ridge of said wave guide cooperate with said wave guide members in determining said serpentine configuration and said means defining said cavities includes a plurality of vanes, said ridge, fingers, wave guide members, and said vanes being of the same width.

9. An electron discharge device in accordance with claim 8 wherein said wave guide is coupled by said slots to each of said cavities, said wave guide members positioned at said vanes but to the other side of said common wall member and said ridge fingers being positioned opposite said slots.

10. An electron discharge device comprising a composite slow wave structure including a plurality of resonant cavities each having an open end and a closed end diametrically opposite thereto and a serpentine wave guide coupled to said cavities by coupling slots of effectively substantially zero electrical length, means for causing electrons to flow past the open ends of said cavities for interaction with said slow wave circuit, means for applying electromagnetic energy to one end of said serpentine wave guide, means for receiving electromagnetic energy from the other end of said wave guide, and means for establishing the match-point frequency of said composite slow wave structure at a desired operating frequency, said last-mentioned means including wave guide members defining the phase shift per period of said serpentine wave guide.

11. A composite slow wave structure for an electron discharge device amplifier comprising a plurality of resonant cavities each having an open end and a closed end diametrically opposite thereto and including a common wall member defining the closed ends of said cavities and a serpentine wave guide having said wall member as one wall of said guide, said wave guide being coupled to said cavities by a plurality of coupling slots through said common wall member and of effectively substantially zero electrical length, and said wave guide including wave guide members attached to said common wall member intermediate said coupling slots for determining the effective electrical length of said serpentine wave guide between adjacent of said slots and the phase shift per period of said slow wave structure.

12. A composite slow wave structure in accordance with claim 11 wherein said wave guide is coupled by said slots to each of said resonant cavities.

13. A composite slow wave structure in accordance with claim 11 wherein said wave guide is a ridge-type guide.

References Cited in the file of this patent

UNITED STATES PATENTS

| | | |
|---|---|---|
| 2,582,186 | Willshaw | Jan. 8, 1952 |
| 2,590,511 | Craig et al. | Mar. 25, 1952 |
| 2,622,158 | Ludi | Dec. 16, 1952 |
| 2,651,001 | Brown | Sept. 1, 1953 |
| 2,808,538 | Cutler | Oct. 1, 1957 |
| 2,810,854 | Cutler | Oct. 22, 1957 |